United States Patent Office 3,239,502
Patented Mar. 8, 1966

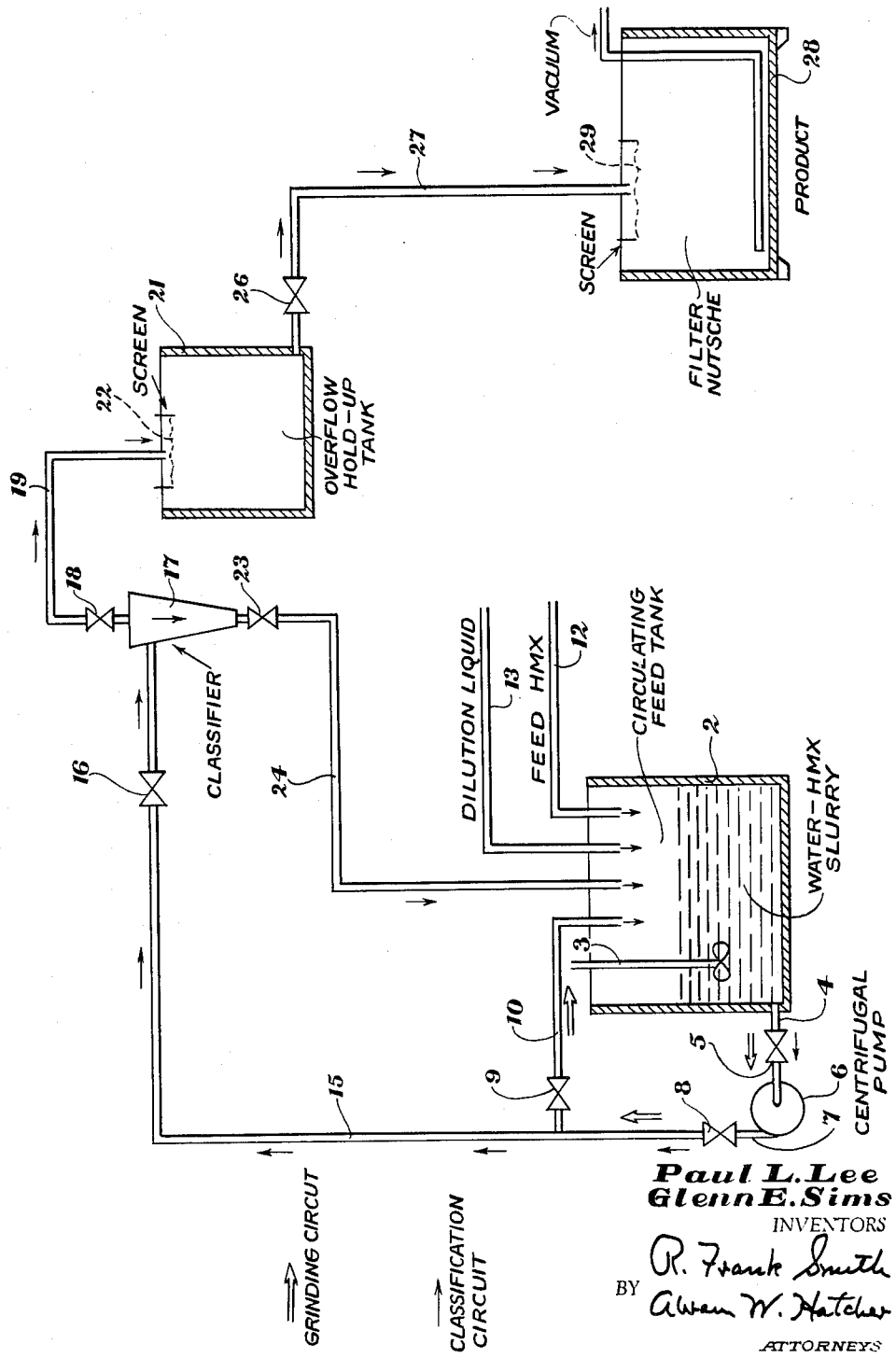

3,239,502
PREPARATION OF FINE HMX
Paul L. Lee and Glenn E. Sims, Kingsport, Tenn., assignors to Eastman Kodak Company, Rochester, N.Y., a corporation of New Jersey
Filed Aug. 31, 1961, Ser. No. 135,355
6 Claims. (Cl. 260—239)

This application is a continuation-in-part of our co-pending application Serial No. 11,891 filed February 29, 1960, now U.S. Patent No. 3,069,477.

This invention relates to the production of HMX in a certain form and purity. More particularly this invention concerns the production of HMX in the form of crystals or particles at least a part of which are less than 325 mesh and of a relatively high purity.

HMX is a known explosive material described in various publications such as "Journal of the American Chemical Society," vol. 73, 1951, pages 2769–2773. Page 2772 of said publication refers to the HMX in the form of large and colorless bipyramid crystals. This explosive product may also be known as cyclotetramethylenetetranitramine. However, for convenience of description herein the simpler term HMX will be used.

In the industry there has developed a demand for HMX in the form of fine particles and of the beta-polymorphic modification. As is known, HMX may exist in several polymorphic forms such as the alpha, beta, gamma and delta. The beta form is preferred because of its lower sensitivity, it being apparent from such sensitivity characteristics that such beta form is more adaptable to certain utilization.

It is therefore believed apparent that the development of procedures for obtaining fine HMX as aforementioned of relatively good purity represents a highly desirable result. After extensive investigation, we have found a process whereby crude HMX may be converted to a fine HMX of excellent purity and that such production may be accomplished on a sizable scale.

This invention has for one object to provide a process of converting crude or as prepared HMX to an HMX of a finer particle size and of an improved purity. Another object is to provide a process of the class indicated which involves cyclonic separation and classification. A further object is to provide a new product consisting substantially entirely of beta-HMX of a size not greater than about 120 microns, and preferably about 44, that is, a size such that 50% or more passes a U.S.S.S. No. 325, and an agglomerated form thereof. Another object is to provide HMX of a purity of the order of at least 97%. A further object of this invention is to provide a method of producing relatively fine HMX and agglomerating same to an agglomerate size of from 297 microns to 840 microns for improved filtering, handling, and processing. This size and the sizes given hereinafter are in terms of the equivalent Stokes diameter. Other objects will appear hereinafter.

In the broader aspects of our invention we have found that HMX as produced and in a somewhat crude form comprised largely of coarse crystals may be converted to the desired fine product. We have found that if the crude HMX is suitably diluted, with an appropriate nonsolvent liquid such as water, methanol, ethanol or the like the resultant slurry may be recirculated in a certain manner by passage through pumps and throttling valves for a sufficient period so that relatively fine sized particles would be obtained as the beta-polymorphic modification. By certain procedures and controls of the dilution, undesired components which may be present, as RDX, are reduced or eliminated by our process. After the reduction of the particle size as aforesaid, the liquid containing the desired fine HMX is further diluted and subjected to cyclonic separation as will be described in detail hereinafter. By such procedure the desired fine HMX will be readily isolated upwardly from the cyclone center and conducted to suitable hold-up tanks. The down flow from the cyclonic separation will contain any coarse HMX which will be returned to the first part of the process.

The liquid containing the fine HMX thus isolated in our process may then be separated from the liquid environment and passed to vacuum filtration and other steps to give the final product which may be packaged or otherwise handled or utilized. To improve filtering and processing, an agglomerating agent may be added to a water slurry of the finely-divided HMX. We have found that cyclic nitramine and cyclic nitrated explosives fines in general may be agglomerated by this procedure. Representative of this group are TNT (trinitrotoluene), cyclotrimethylenetrinitramine (cyclonite or RDX), 2,4,6-trinitrophenylmethylnitramine (tetryl), pentaerythritol tetranitrate (PETN), ammonium picrate (explosive D), 1,2,3,5-tetranitroaniline (TNA), 1,3 - diamino-2,4,6-trinitrobenzene, and the like. Representative of suitable agglomerating agents are n-butyl acetate (20–40% technical grade preferred), isobutyl acetate, cyclohexanone, or one of the former used in conjunction with a comparatively small amount of dioctyl phthalate or other suitable plasticizer such as triacetin, dioctyl sebacate and the like. The particle size and stickiness of the agglomerated product may be controlled by the amount of agglomerating agent added and the length of the digestion period, that is, the length of time agitation is continued after all of the agglomerating agent has been added to the water dispersion. The optimum amount of agglomerating agent to be added is about 1 gram of agglomerating agent for every 5 grams batch of fines. The optimum retention or digestion time is from 10 minutes to a half hour. When dioctyl phthalate or other suitable plasticizer is used in conjunction with one of the agglomerating agents, preferably being added prior to agglomeration, the impact sensitivity of the agglomerated product is reduced. The particle size of the agglomerated product is from 150 microns to 2400 microns, the preferred size being from 300 microns to 2400 microns or an average of about 840 microns. After drying, the product is easily friable and may be conveniently packaged by bagging or conveying into drums, or redispersed, if desired. By this agglomeration procedure volatile components in the HMX may be reduced to a level of 8 to 20% in a minumum length of time.

For a further understanding of our invention reference is made to the attached drawing forming a part of this application. The attached drawing comprises a semidiagrammatic side elevation view of an apparatus arrangement which may be used for carrying out our process and the drawing is somewhat in the nature of a flow sheet.

Referring to the drawing, there is provided a large circulating type tank 2. While it is preferred to construct this tank from stainless steel or the like type of metal material, the tank may be constructed from other materials such as aluminum, glass, or glass-lined metal. The tank may be of any desired capacity depending on the quantities of product that it is desired to process. However, we have found that a tank of approximately 1100 gallons size is quite useful for carrying out the present process and for obtaining good circulation and temperature control. In a similar manner, the various pipes and valves to be referred to hereinafter may be constructed of materials such as aluminum and other nonferrous metals, stainless steel, plastics such as polyvinyl chloride, and cellulose ester material such as that sold under the trademark TENITE Acetate and TENITE Butyrate.

In general we would have one or more agitator devices 3 positioned within the tank. On the larger tanks, several such type agitators may be desirable. Since such type agitators are standard items, extended description is unnecessary.

The lower part of the tank is provided with the withdrawal conduit 4 which leads through valve 5 to a centrifugal pump 6. The pump is connected by conduit 7 through valves 8, 9 and conduit 10 in a manner that the contents of the tank may be withdrawn from the bottom thereof and pumped back into the top of the tank.

Tank 2 is also provided with inlet conduits 12 and 13. These conduits are for the purpose of introducing into the tank the feed HMX which it is desired to convert to the HMX fines and to provide for the introduction of the diluent liquid. The diluent liquid is usually and preferably water. However, in some instances a certain amount of organic solvent exemplified by acetone, alcohol and the like may be introduced.

We have found that for example if the crude HMX contains a certain amount of RDX component, this may be eliminated or reduced by introducing through conduit 13 warm or hot water. Since the RDX is partly soluble therein, this component is taken up by the water thereby accomplishing a separation from the HMX and thereby assisting in the production of the HMX fines of a purity of the order of 97%.

Pump 6 is also connected by means of conduit 15 through valve 16 to the cyclone separator and classifier 17. While this cyclone separator may be of a commercially obtainable construction, we have found for the purposes of the present invention that such units should contain certain features of construction. In further detail, the preferred cyclone separator would be 6 inches or less in diameter equipped with four vortex finders and five apex valves. We have found for obtaining the best results in producing the desired fines at a practical production rate for the present invention that a nominal 6 inch diameter cyclone equipped with a 1 in. apex valve and a 1¼ in. vortex finder are preferably used in the cyclone classification.

The upper part of the cyclone classifier is connected through valve 18 and conduit 19 to the overflow hold-up tank 21. The discharge from conduit 19 preferably is passed through a classifying screen 22. The lower outlet portion of separator 17 is connected through valve 23 and conduit 24 so as to discharge back into feed tank 2.

The hold-up tank 21 just mentioned may be constructed of any of the metal materials referred to above and be of any desired size. We have found that a size of the order of 4400 gallons is satisfactory. In place of a single tank, two or more tanks may be employed.

The tank 21 is connected through valve 26 and conduit 27 to a vacuum filter 28. Since such vacuum filter is a known commercial item, description of the construction thereof appears to be unnecessary. Preferably the discharge from conduit 27 into this vacuum filter will be passed through a suitable screen 29.

An understanding of the operation of the above described apparatus is apparent to a substantial extent from the preceding description. However, the operation will be clear from the following examples which represents our preferred embodiment for carrying out our process.

EXAMPLE I

In this example the feed HMX was of about a 95% initial purity. This feed HMX which it was desired to convert to HMX fines was processed by the following steps:

A. The HMX was charged into tank 2. The amount charged preferably is within the limits of 2,500–3,000 pounds.

B. Water was added to tank 2 until the level raised a few inches then start and stop agitator until it turns freely. With agitator running, continue to add water until the agitator impeller and hub are completely covered.

C. At this point, the slurry should be agitating and circulating good throughout the tank. If not, add water until circulation is good.

D. Open tank outlet valve 5, pump discharge valve 8 and valve 9 on slurry header above top of tank 2.

E. Start tank slurry centrifugal pump and throttle pump discharge valve 8 by closing it about several turns, or until slurry returning to the tank appears to have little or no force behind it. This will hold the slurry in the pump head and allow the impeller to mildly break down the crystals.

F. With the pump and agitator running, pump and grind the diluted crude HMX for about 16 hours, preferably without stopping the pump or agitator.

G. While the slurry is circulating and grinding, the slurry temperature will gradually increase to 50–60° C. As it heats up, introduce cool water into the tank every 15–20 minutes such as by washing down the sides of the tank. If the slurry becomes thick and does not agitate good throughout the tank, add more water to the tank until it does so. In general the tank is kept closed when not adding water or washing down tank.

H. After grinding for approximately 16 hours, add further water to tank 2.

I. Open valve 16 in slurry line above pump leading to the cyclone separator 17. This will allow the slurry to flow to the cyclone separator where the HMX fines overflow from the top into tank 21 and the coarse underflow flows back from the bottom of the separator to the feed tank 2.

J. As the fines overflow into the collection tank 21, the grist size can be reasonably checked by using an 8″ diameter, 200 mesh laboratory screen. As long as the slurry either passes on through the screen freely or can be washed through with a small stream of water, it can be assumed that the HMX will have the desired fine size preferably of less than about 44 microns.

K. Whenever the HMX piles up on the 200 mesh screen and will not wash through, or the level in tank 2 gets to the point where the pump stops pumping, close valve 16 on circulating line leading to separator and valve 18 on overflow line.

(1) If the material left in tank 2 appears coarse and there is over 500–600 pounds, repeat the grinding step as described above and then again feed to the cyclone separator as described above.

(2) If the material left in tank 2 only amounts to 200–300 pounds, leave it in tank for repeated operation, with a further supply of crude HMX feed.

L. Allow the material in tank 21 to settle overnight or longer.

M. After settling, if liquid is clear in tank 21, decant the water out of the tank down to within 6–8 inches of the HMX cake on the bottom of the tank.

N. Agitate contents of tank 21 for about 15 minutes.

O. Drop slurry into nutsches 28 through a 60 mesh screen 29. It is desirable to make sure that the nutsches are clean and that probe socks are in good condition with no holes.

P. Put vacuum on nutsches 28 and dewater. Usually pulling vacuum continuously for 24–36 hours will lower the moisture content of the nutsches to approximately 30%.

Q. Sample the product for analysis and if sufficiently dry and otherwise satisfactory it may be packaged by bagging or conveyed into drums.

Tests of the product produced by the foregoing example showed that the HMX particles were of the desired size of less than about 44 microns. By controlling the time of recirculation we have produced HMX particles of any desired size from 5–120 microns, although best results were achieved in the 10–25 micron particle size range. Also, the purity was in excess of 97% and the product predominantly the $\beta$-polymorphic modification.

At step L above an alternate procedure leading to the pelletization or agglomeration of the fine HMX may be used as follows: To separate portions of a slurry of this product were added respectively technical grade n-butyl acetate (30%), isobutyl acetate (30%), and cyclohexanone (60%) while the masses were under agitation. The above percentages relate the amount of the agglomerating agent to the weight of the HMX suspended. This process was accomplished at substantially room temperature or ambient temperatures. Agitation was continued until visible agglomeration occurred in each. After 10–15 minutes the material from each portion was separately dropped to a vacuum filter and the water removed very rapidly. The agglomerated product in each case retained its structure during normal handling. It was dried to substantial dryness and then packaged, being suitable for redispersing in a suitable solvent. The product from the vacuum filter was such that it may be readily packaged by either bagging or conveying into drums.

EXAMPLE II

A slurry of ground HMX fines (90–98% purity) prepared as in Example I (1:4 ratio by weight of HMX:water) was agitated in a vessel until the HMX appeared to be well dispersed. To the slurry of fine HMX in 2000 ml. of water were added slowly during agitation 125 ml. of n-butyl acetate (technical grade). The agglomeration was complete at the end of the addition of the n-butyl acetate. The average size of the agglomerated product was 840 microns. For this 500 g. batch of HMX of about 90% purity 105 g. of n-butyl acetate were required for optimum agglomeration. Separate HMX batches of 93% and 98% purity respectively were agglomerated in a similar manner with 105 and 113 g. of n-butyl acetate.

EXAMPLE III

In a 10-liter laboratory still pot 500 g. of fine HMX (77% passing a U.S.S. No. 325 sieve) were added to 2000 ml. of water at brisk agitation until the HMX was well dispersed. 125 ml. of n-butyl acetate were added at 42–62 ml./min. and an agitation of 400–500 r.p.m. Agglomeration was complete at the end of the n-butyl acetate addition. The granulated slurry was digested with continued agitation for 10 minutes, followed by discharge of the slurry to a filter. Product taken from the filter bed analyzed 20% volatiles and had an average agglomerate size of 500 to 1410 microns. The product was dried at 110° C. in a steam oven. The material retained a granular shape and remained intact with a hardness comparable to plastic-bonded explosives.

EXAMPLE IV 500 g. of fine HMX were agglomerated as in Example III with the exception that the agglomerated slurry was digested for 30 minutes instead of 10. This batch had comparable agglomeration, but the agglomerates were slightly larger, averaging about 1410 microns in size. The slurry was dropped to a cotton filter bag through which water separated readily leaving about 25–30% moisture (including solvent) retained in pellets and granules.

EXAMPLE V

The procedure of Example III was followed with the following variations:

*Table 1*

| Amount of n-Butyl Acetate Added (ml.) | Length of Digestion Period | Amount of Agglomeration |
| --- | --- | --- |
| 75 | 30 min | Partial. |
| 85 | 15 min | Do. |
| 100 | 15 min | Do. |
| 115 | 15 min | Do. |
| 125 | 15 min | Do. |
| 135 | 2½ hours | Substantially complete within first half hour. |

EXAMPLE VI

The procedure of Example III was followed with the exception that isobutyl acetate was used in place of n-butyl acetate. The product, dried at 110° C. in a steam oven, retained its granular shape and remained intact, again with hardness comparable to other plastic-bonded explosives. The average agglomerate size was 500 to 840 microns.

EXAMPLE VII

The procedure of Example III was followed with the exception that 300 ml. of cyclohexanone were used in place of the 125 ml. of n-butyl acetate. The agglomerate formed had an average size of 840 microns and was somewhat softer than that produced by the addition of n-butyl acetate.

EXAMPLE VIII 2000 lbs. of HMX (nominal 25 micron median diameter) were slurried with 8000 lbs. of water. To the slurry were added 500 lbs. of n-butyl acetate while agitation was being maintained. Agglomeration occurred, accompanied by a change in color of the slurry from milky to clear. The agglomerated HMX was easily dropped to nutsches and readily de-watered with rapid filtration. De-watering, which normally requires 16 hours or more when no agglomeration procedure is used, was substantially completed as rapidly as the material was dropped from the tank. A sample of agglomerated HMX from the first nutsch contained 14% volatiles and was of an average size of 1410 to 1680 microns.

EXAMPLE IX

A mixture of 250 g. of fine HMX (about 25 micron median diameter prepared as in Example I) and 250 g. of coarse HMX (about 50% retained on U.S.S. No. 100 sieve) was slurried with 2000 ml. of water, and to this well dispersed slurry were added 135 g. of n-butyl acetate. Agglomeration occurred, and the material while wet could be readily handled. Upon drying the agglomerated material was quite friable, having an average size of 840 microns.

EXAMPLE X

A slurry of 392 g. of HMX suspended in 2000 ml. of water having a measured impact sensitivity of 27.0 cm. was processed in three separate portions as follows: (Impact sensitivity was measured in centimeters of fall of a 5 kilogram weight to cause detonation of 50% of the samples of HMX. To each portion were added 8 g. of dioctyl phthalate and 108 ml. of n-butyl acetate).

(a) the dioctyl phthalate was added to the slurry of HMX in water before the addition of the n-butyl acetate. The impact sensitivity was 34.0 cm.

(b) The dioctyl phthalate was added to the n-butyl acetate, and then the mixture of n-butyl acetate and dioctyl phthalate was added to the HMX/water slurry. The impact sensitivity of the granulated product was 35.5 cm.

(c) The dioctyl phthalate was added to the slurry of granulated HMX, i.e., the dioctyl phthalate was added after granulation was caused by the addition of n-butyl acetate to the HMX/water slurry. The product had a sensitivity of 27.9 cm.

It can be observed from the above impact sensitivity measurements that the impact sensitivity was decreased by the granulation process wherein dioctyl phthalate was used in conjunction with n-butyl acetate, the greatest decrease being in the case where the dioctyl phthalate was added to the slurry of HMX in water or to the n-butyl acetate before the addition of the n-butyl acetate.

EXAMPLE XI 500 g. of RDX (98% passing a U.S.S. No. 325 sieve) were slurried in 2000 ml. of water and well dispersed. Agglomeration was accomplished substantially in accordance with the procedure used for the agglomeration of HMX in Example III by the addition of 135 ml. of n-butyl acetate. The agglomerate had an average size of 840 microns, retained its granular shape after drying at 110° C. in a still oven, and remained intact, exhibiting excellent hardness.

While in Example I above the circulating and grinding treatment were carried out for approximately 16 hours with respect to the particular quantity of coarse crystals fed into the tank 2, such types of processing may be varied somewhat. That is, with smaller quantities, shorter times of operations will suffice as also in the case when the crystals of the crude are not unduly large. However, in general, we prefer to employ a time of treatment within the range of 4 hours to 24 hours. The degree of the dilution of the feed HMX may be varied somewhat. In general, however, we prefer that the feed HMX be diluted to a slurry of about 40–60% solids. After the pumping recirculation action for several hours and before the slurry containing the fines is conducted to the cyclone separation, we would prefer that the dilution be carried out to an extent that the slurry has approximately 12% or less solids. As described above, certain of this further dilution may be accomplished in the tank for temperature control purposes and the remainder accomplished just prior to the conducting of the slurry to the cyclone separator.

Although we have described the removal of the supernatant aqueous media by decantation, as this is a relatively simple economical procedure, it is apparent that other suitable ways of separating the water may be employed such as by siphoning, centrifuging and the like.

The invention has been described in detail with particular reference to preferred embodiments thereof, but it will be understood that variations and modifications can be effected within the spirit and scope of the invention as described hereinabove and as defined in the appended claims.

We claim:

1. A process of increasing the filterability and processability of explosives which comprises adding an agglomerating agent selected from the group consisting of n-butyl acetate, isobutyl acetate, and cyclohexanone and mixtures of the foregoing with agitation to a water slurry of fines of an explosive selected from the group consisting of cyclotetramethylenetetranitramine; cyclotrimethylenetrinitramine; trinitrotoluene; 2,4,6-trinitrophenylmethylnitramine; pentaerythritol tetranitrate; ammonium picrate; 1,2,3,5-tetranitroaniline and 1,3-diamino-2,4,6-trinitrobenzene thereby producing agglomerates of an average size of about 800 microns, filtering, and drying the resulting agglomerated product.

2. The process according to claim 1 wherein an organic ester-type explosives desensitizer is used in conjunction with the agglomerating agent, said desensitizer being added prior to the filtering.

3. The process according to claim 1 wherein the agglomerating agent comprises n-butyl acetate amounting to about 30% by weight of the explosive and an organic ester-type explosives desensitizer comprising dioctyl phthalate amounting to about 6% by weight of the explosive is used in conjunction with the agglomerating agent, said desensitizer being added prior to the filtering.

4. In a process for the production of cyclotetramethylenetetranitramine fines by submitting an aqueous slurry of crude cyclotetramethylenetetranitramine to a pumping recirculation treatment for at least 10 hours, the step of adding prior to filtering an agglomerating agent selected from the group consisting of n-butyl acetate, isobutyl acetate, and cyclohexanone and mixtures of the foregoing with agitation to a water slurry of cyclotetramethylene tetranitramine fines, thereby producing agglomerates of an average size of about 800 microns and increasing the filterability and processability of said fines.

5. A $\beta$-polymorphic cyclotetramethylenetetranitramine agglomerated product having an average agglomerate size of about 800 microns, an impact sensitivity of about 30 cm., a volatiles content of not greater than about 20%, and a particle size of an equivalent median diameter of not greater than 120 microns agglomerated by an agglomerating agent selected from the group consisting of n-butyl acetate, isobutyl acetate, and cyclohexanone.

6. As a new article of manufacture granular agglomerated $\beta$-polymorphic cyclotetramethylenetetranitramine of an agglomerate size of from about 300 microns to about 2400 microns, an impact sensitivity of at least about 30 cm., a volatiles content of not greater than about 20 percent and a purity of greater than about 95 percent.

References Cited by the Examiner

UNITED STATES PATENTS

| Re. 22,454 | 3/1944 | Wiegand et al. | 23—314 XR |
| 2,510,966 | 6/1950 | Flanagan | 260—31.8 XR |
| 2,678,927 | 5/1954 | Wright et al. | 260—248 |
| 2,760,972 | 8/1956 | Joy | 260—31.8 XR |
| 2,864,784 | 12/1958 | Marks | 260—31.8 XR |
| 3,069,477 | 12/1962 | Lee et al. | 260—239 |

FOREIGN PATENTS 857,175 12/1960 Great Britain.

OTHER REFERENCES

Afanas'ev et al.: Doklady Akad. Nauk S.S.S.R., vol. 138, pages 886 to 889 (1961).

WALTER A. MODANCE, *Primary Examiner.*

L. D. ROSDOL, JOHN D. RANDOLPH, *Examiners.*